United States Patent

Turnhout

[15] 3,696,505

[45] Oct. 10, 1972

[54] UNILATERALLY METALLIZED ELECTRET FOIL

[72] Inventor: Jan Van Turnhout, Delft, Netherlands

[73] Assignee: Nederlandse Organisatie voor Toegepast-Natuurwetenschappelijk Onderzolk ten behoeve van Nijverheid, Handel en Verkeer the Hague, Netherlands

[22] Filed: July 1, 1969

[21] Appl. No.: 838,110

[30] Foreign Application Priority Data

July 10, 1968  Netherlands..............6809738

[52] U.S. Cl.................................29/592, 307/88 ET
[51] Int. Cl.................................H01s 4/00
[58] Field of Search.......179/100.41 B, 111 E; 178/6; 29/592; 204/165; 307/88 ET; 317/262 F

[56] References Cited

UNITED STATES PATENTS

| 3,316,620 | 5/1967 | Stewart........................29/592 |
| 3,449,093 | 6/1969 | Baxt et al....................29/195 |

FOREIGN PATENTS OR APPLICATIONS

| 610,297 | 10/1948 | Great Britain.............179/111 |

Primary Examiner—John F. Campbell
Assistant Examiner—D. M. Heist
Attorney—Watson, Cole, Grindle & Watson

[57] ABSTRACT

The method for the manufacture of a unilaterally metallized electret foil wherein a double spiral, made up of a first unilaterally metallized foil, the metallized surface of which abuts with the non-metallized surface of a second unilaterally metallized foil, is first heated, then a direct voltage is connected to the two metal layers and next the double spiral is cooled down to room temperature. The tension between the layers is removed, the double spiral is unwound and the foils are taken apart.

2 Claims, No Drawings

UNILATERALLY METALLIZED ELECTRET FOIL

The invention relates to a method for the manufacture of a unilaterally metallized electret foil and the electret foil obtained thereby.

Some dielectrics show a permanent electrostatic charge at two opposite surfaces, as a result of a specific pretreatment. This electrostatic charge retains its character also if the pretreated dielectric material is not in an external electric field. These kinds of material are called electrets. Electrets of foils and high-molecular substances such as polyethylene terephthalate, polypropylene, polyimides, polycarbonates, polytetrafluoroethylene, polyfluoroethylene propylene, polymethylmethacrylate and polymethylmethacrylate derivatives are of primary importance.

The pretreatment for converting such dielectrics into electrets, the so-called forming, requires that the material is heated between two live electrodes in a direct voltage field, and that this condition is allowed to continue for some time. The material is allowed to cool-down in the field and only then the electret is removed from the field.

Electrets may be used in all kinds of applications where use is made of an electric charge field. The dielectric induction of the electret is used to best advantage, for example, in microphones, hydrophones, pressure gauges, vibration pick-ups, displacement meters, accelerometers, telephones, gramophone pickups and high voltage generators. Moreover, the electrostatic attraction or repulsion is applied, e.g., in dust filters, voltmeters and loud speakers. The discharge of electrets can be used in irradiation dosimetry.

Almost invariably the electret is used most efficiently if only one of the surface charges is active, hence the electret is placed with one of its surfaces on a conductor.

It is one object of the invention to provide a method for making an electret that is unilaterally direct provided with a conductive layer.

It is another object of the invention to provide an inexpensive method for the manufacture of electrets of the type specified herein, wherein the size of the surface is not delimitated by the forming voltage.

A decay in charge arises as a result of moisture and especially of heat. It is possible, however, to manufacture electrets that keep their good quality for years.

How to determine the suitable temperature, period of time and field strength during forming is known to those skilled in the art. For polymethylmethacrylate, for example, the aforementioned conditions are: 110°–140° C., 10–100 KV/cm and 2–4 hours; for polyethylene terephthalate the conditions are: 110°–150° C., 10–400 KV/cm In order to obtain the unilaterally metallized electret foil according to the invention, on a first unilaterally metallized foil, preferably in the shape of a long strip, a second unilaterally metallized (substantially equally long) foil is placed in such a way that the metal surface of the first foil is pressed abuttingly on to the non-metallized surface of the second foil, whereupon the foils are wound together into a spiral. At the accessible extremity of this double spiral are the first and the second layers of metal; between these layers the electric voltage is imposed that provides the electric field required that is the same for each winding of the two foils. Thereafter, for the sake of " forming," the spiral is heated and cooled-down again, the field is switched off and the spiral is unwound again so that two unilaterally metallized electrets are obtained. Those electrets may, but need not consist of the same organic material or the same metals. Moreover, the foils may be provided with pores, as according to the invention voltages are used that, at the geometry chosen, remain below the breakdown voltage of air.

As is known in the art the breakdown voltage is shown by the Paschen graph, which shows a highly increasing course at decreasing electrode distances.

If the electrets are to be stored they are left for the time being in their spiral shapes or rewound into a double spiral. Moreover it is advantageous to connect the two metal layers with each other electrically via a metal wire or strip, during storage. Through this procedure, the discharge of the electrets during storage is greatly delayed.

Obtaining the unilaterally metallized starting foil is simple; for this purpose, for example, metal vaporizing techniques known in the art can be applied. The nature of the metal is hardly relevant, provided it adheres to the surface. It is desirable, though that the metal has a clearance from the edges of the foil over a small portion of the foil. The free surface reduces the chances of electric short circuiting, surface conduction and flashing during "forming."

Thus good electrets are obtained with a high, unipolar and uniform heteropolar charge. By "-heteropolar charge" is meant the charge, which results from directing dipoles under the influence of the electric field and from the migration of charge carriers in the organic material.

Consequently, according to the invention the method for the manufacture of a unilaterally metallized electret, using a foil of a high molecular substance, is formed by a the forming process applied to a double spiral comprising a first unilaterally metallized foil, the metallized surface of which closely abuts the non-metallized surface of a second unilaterally metallized foil. The voltage for forming is applied to the two metal layers and after forming the double spiral is unwound so that the foils can be taken apart.

The foils are preferably thin, in the order of some thousandths up to some tenths of a millimeter. Because of the double spiral construction, extremely good electrets are obtained. Owing to the metal layer the compensation, required for use, of one of the surface charges is obtained automatically.

From polarization tests, it was shown that the charges of the electrets obtained according to the invention are in the order of 50–140 nC/cm$^2$ (nano Coulombs per square centimeter) of foil surface area. The effect of these charges corresponds to an electric field of 600–1700 KV/cm (Kilovolts per cm). This is exceptionally high. Besides it was found that the charge distribution was very uniform and that the charge was very unipolar.

Two unilaterally aluminized foils of polyethylene terephthalate, each 0.013 mm thick, 2 cm wide and 500 cm long, were placed on top of the other, and tightly wound into a double spiral. Between the two metal layers a direct current voltage of 400 v was imposed. Next, within an hour the temperature was raised to 120° C., the double spiral was kept at this temperature for three hours and was cooled down to room temperature, whereupon the field was switched off. With an inductive charge meter a permanent heteropolar charge of 60 nC/cm² was measured Decay measurements justify the expectation that this permanent charge will retain the aforesaid order of magnitude for at least some years. Upon heating to 50° C. little charge disappeared; above that temperature the heteropolar charges were liberated more easily. It was found that from such an electret at room temperature under usual atmospheric conditions a charge of 1–2 nC/cm² a month was lost.

I claim:

1. A method for the manufacture of a uni-polarized electret comprising the steps of:

forming a first electret foil from a strip of dielectric material having an electrical conductor formed on one surface thereof;

forming a second electret foil from a strip of dielectric material having an electrical conductor formed on one surface thereof;

winding said first and second electret foils into a spiral with the electrical conductor of said first electret foil in abutting relationship with the dielectric material of said second electret foil;

applying a d.c. voltage between the electrical conductors of said first and second electret foils;

heating and subsequently cooling the spirally wound first and second electret foils;

removing said d.c. voltage; and unwinding said first and second uni-polarized electret foils.

2. The method as in claim 1 wherein said first and second dielectric material is polyethylene terephthalate, said direct current voltage is 400 volts, said heating is at a temperature of 120° C. maintained for approximately three hours and said cooling is a reduction of said temperature to ambient temperature.

* * * * *